US005974054A

United States Patent [19]

Couts et al.

[11] Patent Number: 5,974,054

[45] Date of Patent: Oct. 26, 1999

[54] METHOD AND APPARATUS IN A RADIO MESSAGING SYSTEM FOR FORMING A CURRENT FRAME OF DATA WHILE MAINTAINING A CORRECT TRANSMISSION ORDER FOR NUMBERED MESSAGES

[75] Inventors: Jeffrey D. Couts, Fort Worth; W Garland Phillips, Arlington, both of Tex.

[73] Assignee: Motorola, Inc., Schaumburg, Ill.

[21] Appl. No.: 08/839,185

[22] Filed: Apr. 23, 1997

[51] Int. Cl.[6] ...................................................... H04B 7/00

[52] U.S. Cl. .......................... 370/470; 370/340; 455/426

[58] Field of Search .................................... 370/328, 329, 370/336, 337, 338, 341, 345, 347, 470, 230, 231, 235, 252, 394, 412, 428, 429, 340; 455/422, 426, 507, 514, 466, 520

[56] References Cited

U.S. PATENT DOCUMENTS

| | | | |
|---|---|---|---|
| 5,278,890 | 1/1994 | Beeson, Jr. et al. | 370/328 |
| 5,337,344 | 8/1994 | Alvasalo | 455/426 |
| 5,457,735 | 10/1995 | Erickson | 455/507 |
| 5,778,323 | 7/1998 | Dorenbosch et al. | 455/507 |

*Primary Examiner*—Ricky Ngo
*Attorney, Agent, or Firm*—R. Louis Breeden

[57] ABSTRACT

A processor (208) selects a candidate message (214) from a message queue (212), and tests (306) whether an available space (216) in the current frame of data is sufficient to accommodate the candidate message. The processor records (320, 420) a skip indicator (218, 220) into a predetermined memory location, in response to the candidate message being a numbered message and the available space in the current frame being insufficient. The processor skips (316) the candidate message during the current frame even though available space is sufficient, when the skip indicator is recorded in the predetermined memory location and is applicable to the candidate message. The processor adds (332) the candidate message to the current frame of data, when the available space in the current frame is sufficient and the candidate message is a message not affected by the skip indicator. The processor continues (330) to select, test, record, skip, and add, as above, to form the current frame of data.

16 Claims, 4 Drawing Sheets

110

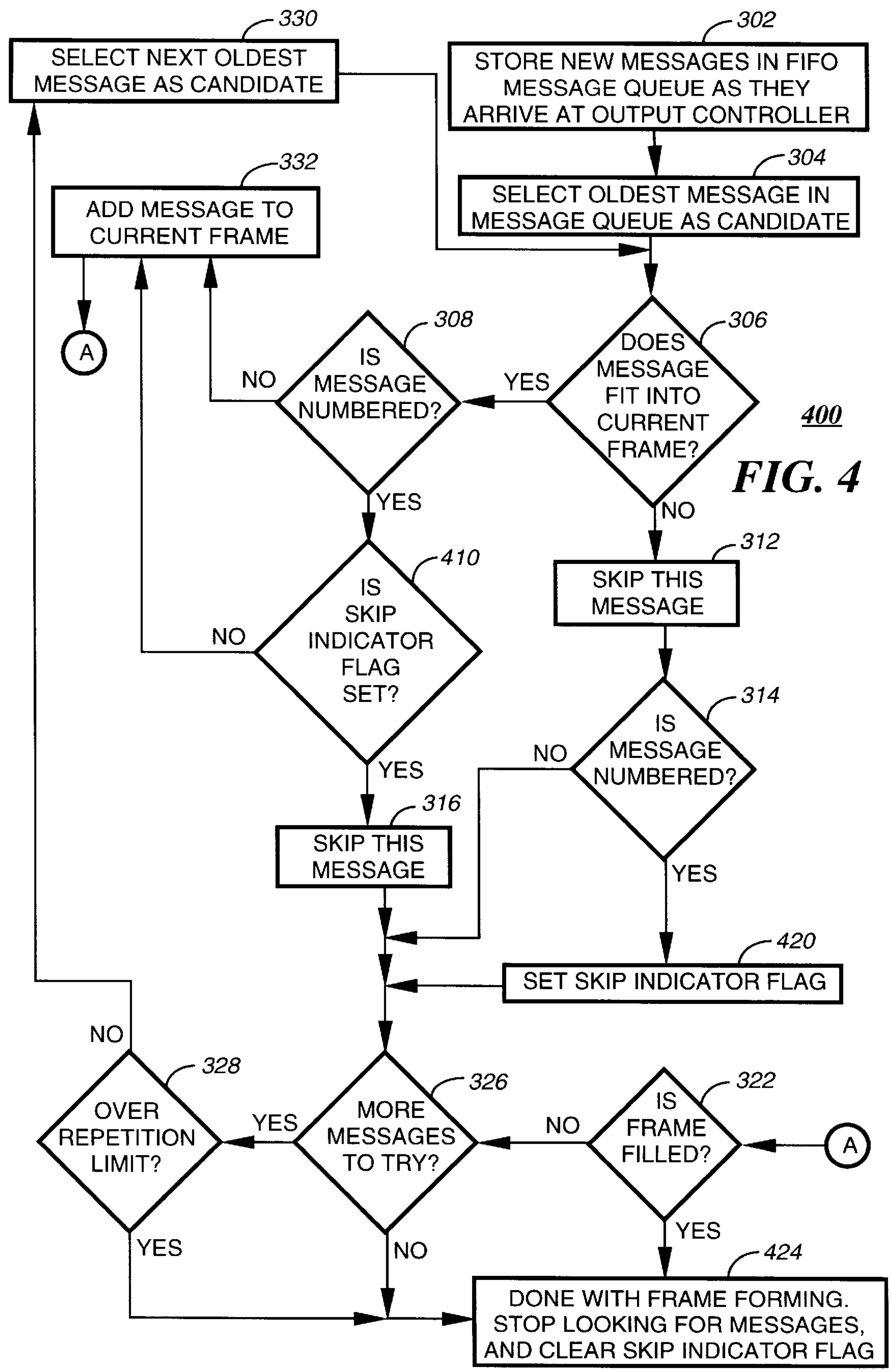

330
SELECT NEXT OLDEST MESSAGE AS CANDIDATE
302
STORE NEW MESSAGES IN FIFO MESSAGE QUEUE AS THEY ARRIVE AT OUTPUT CONTROLLER
304
SELECT OLDEST MESSAGE IN MESSAGE QUEUE AS CANDIDATE
332
ADD MESSAGE TO CURRENT FRAME
A
308
IS MESSAGE NUMBERED?
NO
YES
306
DOES MESSAGE FIT INTO CURRENT FRAME?
YES
NO
400
FIG. 4
410
IS SKIP INDICATOR FLAG SET?
NO
YES
312
SKIP THIS MESSAGE
314
IS MESSAGE NUMBERED?
NO
YES
316
SKIP THIS MESSAGE
420
SET SKIP INDICATOR FLAG
NO
328
OVER REPETITION LIMIT?
YES
326
MORE MESSAGES TO TRY?
YES
NO
322
IS FRAME FILLED?
NO
YES
A
424
DONE WITH FRAME FORMING. STOP LOOKING FOR MESSAGES, AND CLEAR SKIP INDICATOR FLAG

METHOD AND APPARATUS IN A RADIO MESSAGING SYSTEM FOR FORMING A CURRENT FRAME OF DATA WHILE MAINTAINING A CORRECT TRANSMISSION ORDER FOR NUMBERED MESSAGES

FIELD OF THE INVENTION

This invention relates in general to radio communication systems, and more specifically to a method and apparatus in a radio messaging system for forming a current frame of data while maintaining a correct transmission order for numbered messages.

BACKGROUND OF THE INVENTION

Message numbering is an increasingly popular feature of radio messaging systems. This feature, which typically sends a two-digit message sequence number along with each message, is intended to increment the number by unity with each subsequent message. Thus, if a subscriber receives a message number that is more than a unity increment higher than the last received message, then the subscriber must have missed a message. In a system which offers message retrieval the subscriber can call in and retrieve the message associated with the missing message number.

Message numbering can degrade transmission efficiency, however, because to guarantee that the message number remains in sequence, each numbered message must be transmitted in the same order in which the message was received from the central control terminal which numbered the message. This implies that when forming a frame of data for transmission, the output controller cannot switch the order of numbered pages. On the other hand, for greatest transmission efficiency and highest system capacity the output controller must assemble the frame of data with messages that fill the frame as fully as possible. This implies a necessity for swapping messages that are too long to fit into the current frame, with shorter messages that can fit. In prior art systems, that has required switching the transmission order of the swapped messages, thereby confusing subscribers who use message numbering for detecting missed messages.

Thus, what is needed is a method and apparatus that dependably transmits message numbers in the proper sequence, while at the same time allowing optimal filling of each frame of data.

SUMMARY OF THE INVENTION

An aspect of the present invention is a method in a radio messaging system for forming a current frame of data, while maintaining a correct transmission order for numbered messages. The method comprises the steps of selecting a candidate message from a message queue, and testing whether an available space in the current frame of data is sufficient to accommodate the candidate message. The method further comprises the steps of recording in a predetermined memory location a skip indicator, in response to the candidate message being a numbered message and the available space in the current frame being insufficient; and skipping the candidate message during the current frame even though available space is sufficient, when the skip indicator is recorded in the predetermined memory location and is applicable to the candidate message. The method further comprises the steps of adding the candidate message to the current frame of data, when the available space in the current frame is sufficient and the candidate message is a message not affected by the skip indicator; and repeating the selecting, testing, recording, skipping, and adding steps to form the current frame of data.

Another aspect of the present invention is an output controller in a radio messaging system for forming a current frame of data, while maintaining a correct transmission order for numbered messages. The output controller comprises an input interface for receiving messages, a processor coupled to the input interface for processing the messages, an output interface coupled to the processor for controlling a radio transmitter to transmit the messages, and a memory coupled to the processor for programming the processor and for storing variables processed by the processor. The processor is programmed to select a candidate message from a message queue in the memory, and to test whether an available space in the current frame of data is sufficient to accommodate the candidate message. The processor is further programmed to record in a predetermined memory location a skip indicator, in response to the candidate message being a numbered message and the available space in the current frame being insufficient, and to skip the candidate message during the current frame even though available space is sufficient, when the skip indicator is recorded in the predetermined memory location and is applicable to the candidate message. The processor is also programmed to add the candidate message to the current frame of data, when the available space in the current frame is sufficient and the candidate message is a message not affected by the skip indicator; and to continue to select, test, record, skip, and add, as above, to form the current frame of data.

BRIEF DESCRIPTION OF THE DRAWINGS

FIG. 4 is a flow diagram depicting operation of the output controller in accordance with an alternative embodiment of the present invention.

DETAILED DESCRIPTION OF THE DRAWINGS

Figure 1:
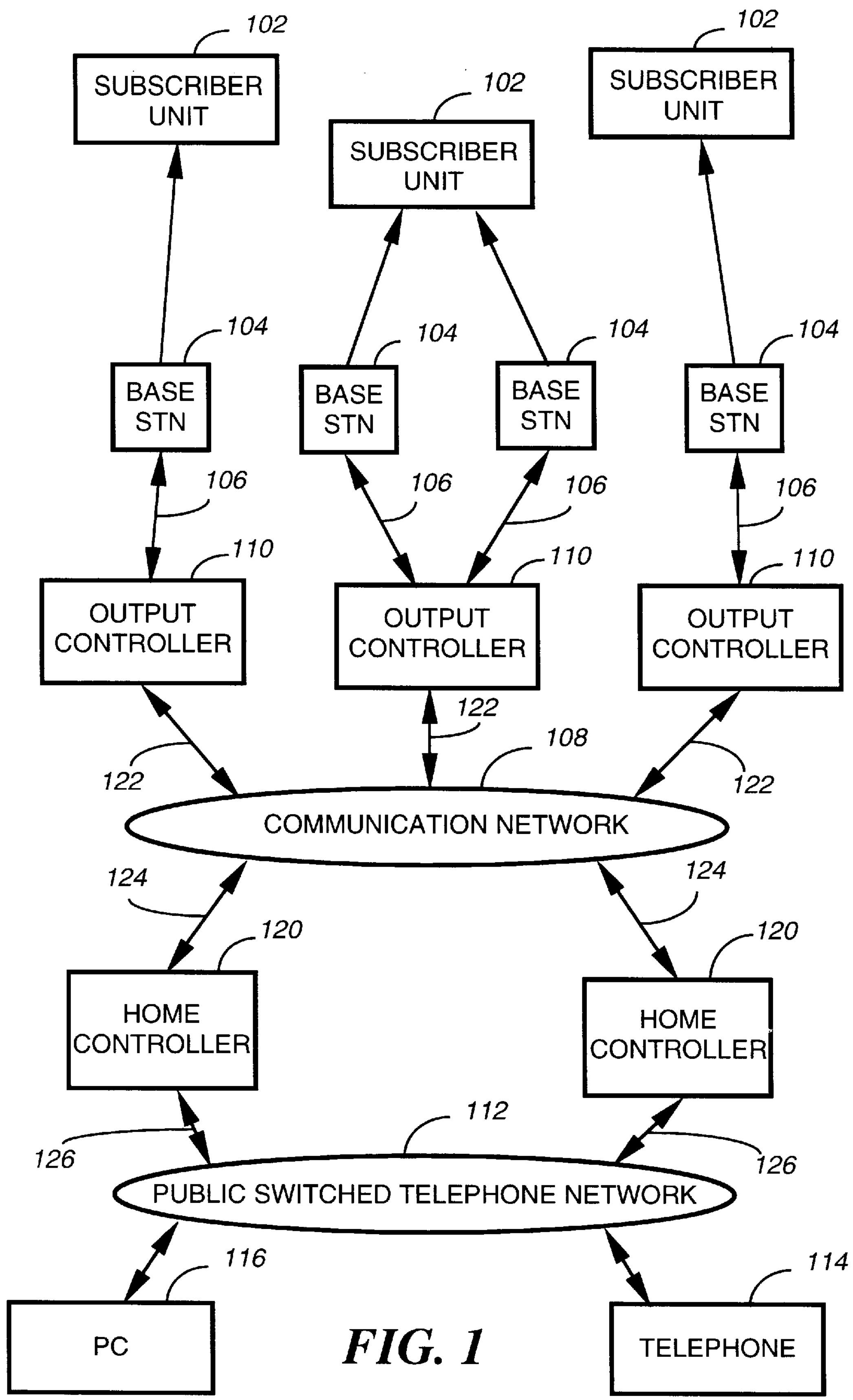
FIG. 1 is an electrical block diagram of a radio messaging system in accordance with the present invention.

Referring to FIG. 1, an electrical block diagram of a radio messaging system in accordance with the present invention comprises a plurality of conventional subscriber units 102, which communicate by radio with a plurality of conventional base stations 104 for receiving selective call messages. The base stations 104 are coupled via conventional communication links 106 to a plurality of output controllers 110 for control thereby utilizing well-known techniques for base station control. The output controllers 110 are coupled to at least one home controller 120 via communication links 122, 124, and via a conventional communication network 108 for receiving the selective call messages from the home controller 120. The home controller 120 and the output controllers 110 preferably communicate by utilizing a well-known protocol, e.g., the Telocator Network Paging Protocol (TNPP) or the InterPaging Networking Protocol (IPNP). The home controller 120 is preferably coupled via telephone links 126 to a public switched telephone network (PSTN) 112 for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controller 120. The hardware of the home controllers 120 is preferably similar to the Wireless Messaging Gateway (WMG™) Administrator! paging terminal, while the hardware of the output controllers 110 is preferably similar to that of the RF-Conductor!™ message distributor, both manufactured by Motorola, Inc. of Schaumburg, Ill. The base stations 104 are preferably similar to the Nucleus® Orchestra! transmitter manufactured by Motorola, Inc. It will be appreciated that other similar hardware can be utilized as well for the home controller 120, the output controllers 110, and the base stations 104. By way of example, the radio messaging system depicted in FIG. 1 is a one-way radio messaging system. It will be appreciated that the present invention can be applied to a two-way radio messaging system as well.

The protocol utilized for transmitting the messages between the base stations 104 and the subscriber units 102 is preferably similar to Motorola's well-known FLEX™ family of digital selective call signaling protocols. It will be appreciated that other similar messaging protocols can be used as well. These protocols utilize well-known error detection and error correction techniques and are therefore tolerant to bit errors occurring during transmission, provided that the bit errors are not too numerous in any one code word. The protocols preferably transmit messages in synchronous frames of predetermined length, e.g., 1.875 seconds. Thus, when forming a next frame of data for transmission, it is desirable to be able to locate a combination of queued messages of a length that will optimally fill the frame. Otherwise, idle bit patterns will have to be transmitted, thus wasting valuable airtime.

Figure 2:
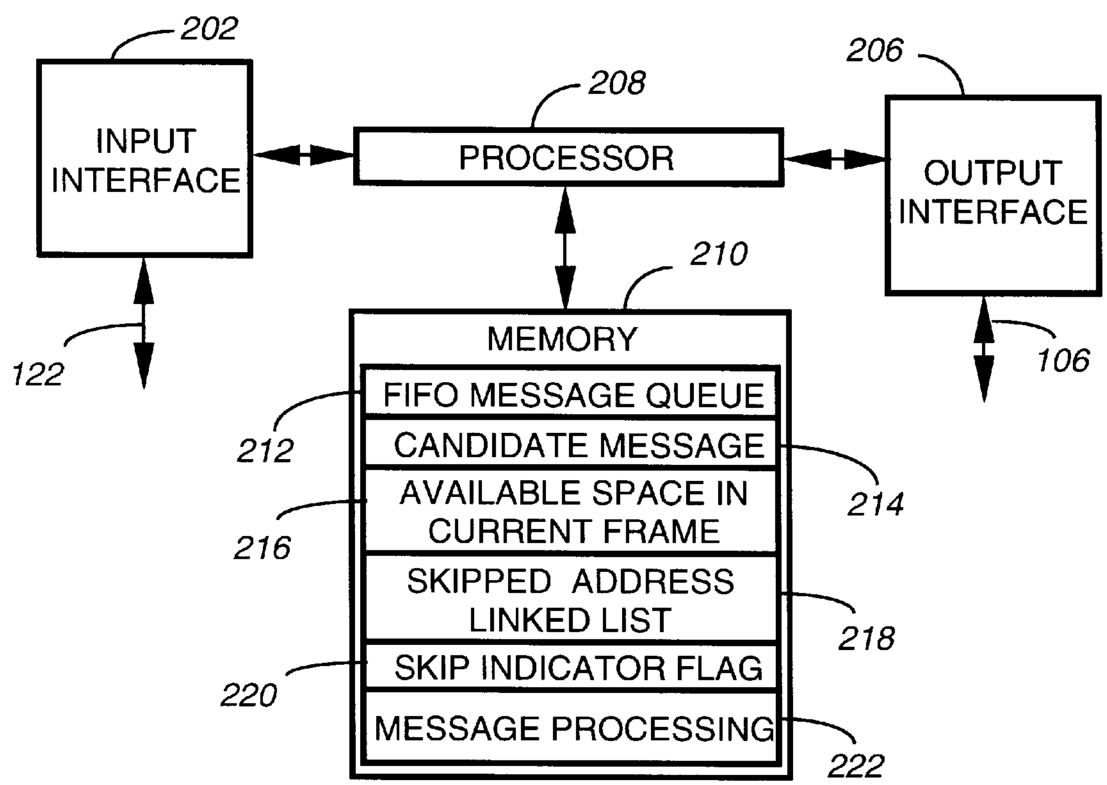
FIG. 2 is an electrical block diagram of an output controller in accordance with the present invention.

FIG. 2 is an electrical block diagram of the output controller 110 in accordance with the present invention. The output controller 110 comprises a conventional input interface 202 coupled to the communication link 122 for receiving a message from a message originator. The output controller 110 further comprises a conventional processor 208 for processing the message, and a conventional output interface 206 coupled to the communication link 106 for outputting the message through the base stations 104. The processor 208 is coupled to a conventional memory 210 comprising a message processing element 222 for programming the processor 208, and other locations for storing messages and variables handled by the processor 208. In the preferred embodiment, the memory 210 further comprises a first-in, first-out (FIFO) message queue 212 for storing messages in an order received from the home controller 120. The memory 210 further comprises a location for storing a candidate message 214 being considered for addition to a current frame of data to be sent to the base stations 104. In addition, the memory 210 includes a location where the processor keeps track of available space 216 in the current frame for adding another message.

In the preferred embodiment, the memory also includes a skipped address linked list 218, which contains selective call addresses corresponding to any numbered messages that were temporarily skipped due to lack of available space in the current frame. Each selective call address in the skipped address linked list 218 is used as a skip indicator to prevent any further transmission of numbered messages to the selective call address during the current frame, while advantageously allowing non-numbered messages and numbered messages to other selective call addresses to be used to optimally fill the current frame, as explained further below.

In an alternative embodiment, a skip indicator flag 220 is utilized as the skip indicator. The skip indicator flag 220 is set in response to a numbered message being skipped due to lack of available space in the current frame. Thereafter, no further numbered messages (to any address) are allowed to be added to the current frame. The alternative embodiment has the advantage of requiring less processing power and memory space to operate. A disadvantage, however, is that the alternative embodiment allows the remainder of the frame after a numbered message is skipped to include only non-numbered messages. This can be a strong disadvantage when the system traffic includes a high percentage of numbered messages, as there may not be enough non-numbered messages in the message queue for optimally filling the frame.

Figure 3:
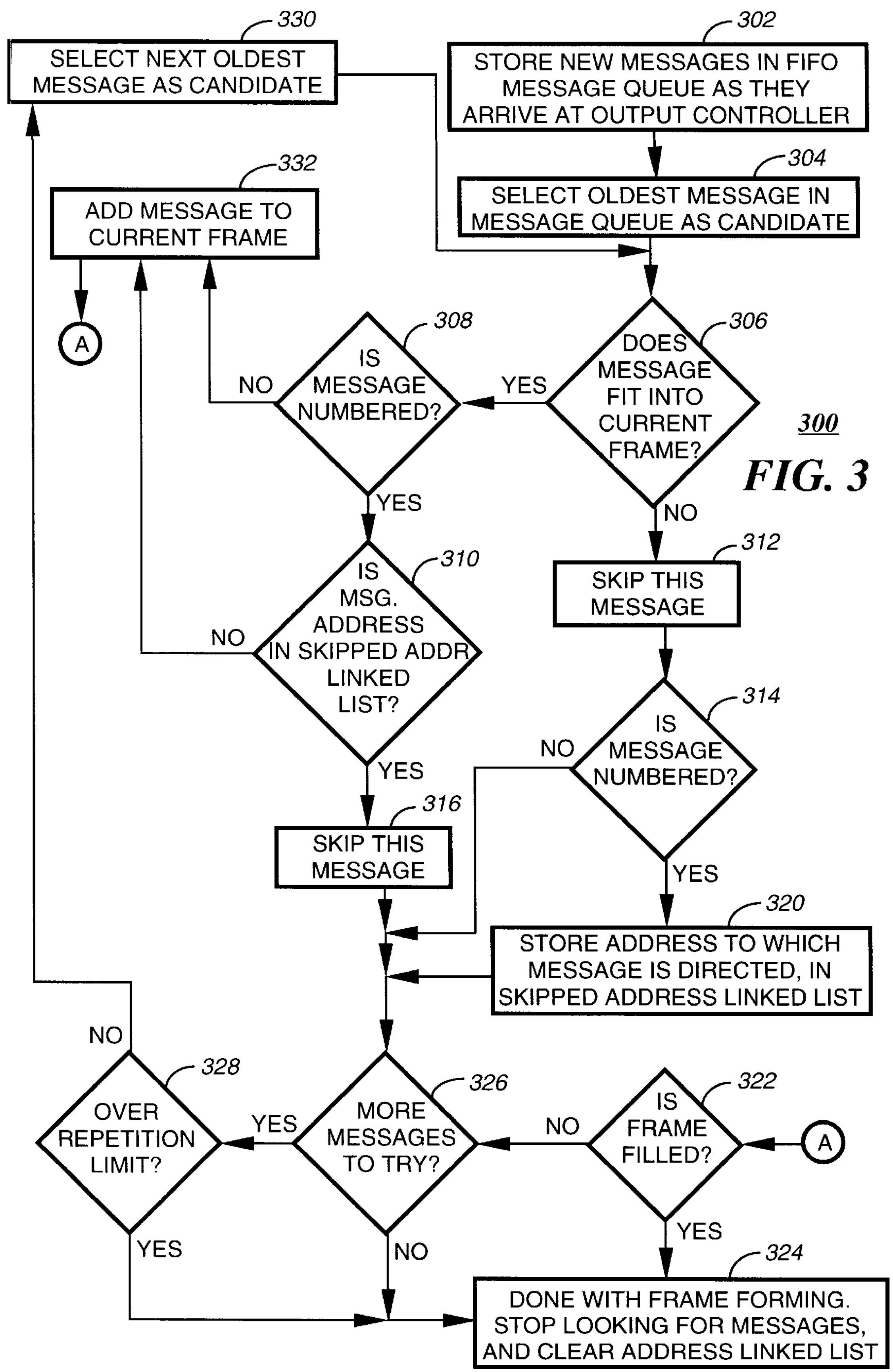
FIG. 3 is a flow diagram depicting operation of the output controller in accordance with the preferred embodiment of the present invention.

FIG. 3 is a flow diagram 300 depicting operation of the output controller 110 in accordance with the preferred embodiment of the present invention. The flow begins with the processor 208 accessing the message processing element 222 and storing 302 new messages in the FIFO message queue 212 as the new messages arrive at the output controller 110 from the home controller 120. The messages preferably include at least some numbered messages having sequence numbers supplied by the home controller 120 and communicated to the output controller 110 utilizing well-known techniques. The processor 208 then accesses the FIFO message queue 212 and selects 304 the oldest message in the queue as a candidate message. Then the processor 208 accesses the available space 216 in the current frame and tests 306 whether the available space in the current frame of data is sufficient to accommodate the candidate message. If the available space is insufficient (as will be the case on some later pass through the steps of filling the frame), then the candidate message is skipped 312, i.e., left in the FIFO message queue 212 to be added to a subsequent frame. In addition, the processor 208 checks 314 whether the candidate message is a numbered message. If so, the processor 208 records a skip indicator into a predetermined location of the memory 210. More specifically, in the preferred embodiment, the processor 208 stores 320, in the skipped address linked list 218, the selective call address to which the skipped message is directed. The processor 208 then checks 326 whether there are more messages in the FIFO message queue 212 that have not yet been selected as the candidate message for the current frame. If not, then the frame forming is done and the processor 208 moves the flow to step 324, and thus stops looking for more messages, clears the skipped address linked list 218 in preparation for a new frame, and sends the current frame to the base stations 104.

If, on the other hand, at step 326 there are more messages that have not been selected, the processor checks 328, using well-known techniques, whether the number of candidate messages that have been selected and rejected for the current frame is greater than a predetermined repetition limit set for the output controller 110. If so, the processor 208 is done with frame forming and the flow moves to step 324. If not, the flow moves to step 330, where the processor 208 selects a next oldest message as the candidate message, and the flow returns to step 306 for a next iteration. If at step 306 the candidate message does fit into the available space in the current frame, the processor 208 checks 308 whether the candidate message is a numbered message. If not, then any skip indicator recorded is not applicable to the candidate message, so the processor adds 332 the candidate message to the current frame and thence moves to step 322 to check whether the frame is full. If so, the processor 208 is done with frame forming and thus moves to step 324. If not, the processor 208 moves to step 326 to see if there are more messages to select.

If, on the other hand, at step 308 the candidate message is a numbered message, then the processor checks 310 whether there is a skip indicator applicable to the candidate message. More specifically, for the preferred embodiment, the processor 208 checks whether the selective call address to which the candidate message is addressed is in the skipped address linked list 218. If not, the processor 208 moves to step 332 to add the message to the current frame. If so, the processor 208 skips 316 the candidate message, and the flow moves to step 326 to see if there are more messages to select.

In the manner described above, the processor 208 can fill the frame of data with any message in the message queue 212, provided that the message is not a numbered message being sent to a selective call address for which another numbered message has been skipped. Thus, the processor 208 advantageously is free to continue filling the frame with any message(s) that will fit into the space available, thereby optimally filling the frame, while maintaining a zero probability that any numbered messages will be sent in the wrong order.

FIG. 4 is a flow diagram 400 depicting operation of the output controller 110 in accordance with an alternative embodiment of the present invention. The flow diagram 400 is similar to the flow diagram 300, the essential difference being that steps 420, 410, and 424 of the flow diagram 400 replace steps 320, 310, and 324, respectively, of the flow diagram 300. At step 420 the processor 208 sets the skip indicator flag 220 instead of storing an address in the skipped address linked list 218. At step 410 the processor 208 checks whether the skip indicator is set, instead of checking whether the selective call address to which the candidate message is addressed is in the skipped address linked list 218. At step 424 the processor 208 clears the skip indicator flag 220, instead of clearing the skipped address linked list 218. The effect of these differences is that in the alternative embodiment, after a numbered message is skipped because of insufficient available space in the current frame, no further numbered messages can be added to the current frame. The alternative embodiment requires less processing power and memory space than the preferred embodiment, but will not function as well as the preferred embodiment will function in systems that have a high ratio of numbered to non-numbered messages. This is because in such systems it is likely that there will be too few non-numbered messages in the message queue 212 to optimally fill the current frame after further numbered messages are barred from being added.

Thus, it should be clear from the foregoing that the present invention advantageously provides a method and apparatus that dependably transmits message numbers in the proper sequence, while at the same time providing a technique for optimal filling of each frame of data. While the foregoing has disclosed by way of example two embodiments in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method in a radio messaging system for forming a current frame of data, while maintaining a correct transmission order for numbered messages, the method comprising the steps of:

selecting a candidate message from a message queue;

testing whether an available space in the current frame of data is sufficient to accommodate the candidate message;

testing whether the selected candidate message is a numbered message;

recording in a predetermined memory location a skip indicator, in response to the candidate message being a numbered message and the available space in the current frame being insufficient;

skipping the candidate message during the current frame even though available space is sufficient, when the skip indicator is recorded in the predetermined memory location and is applicable to the candidate message;

adding the candidate message to the current frame of data, when the available space in the current frame is sufficient and the candidate message is a message not affected by the skip indicator; and repeating the selecting, testing, recording, skipping, and adding steps to form the current frame of data.

2. The method of claim 1, wherein the skip indicator comprises a selective call address corresponding to the candidate message, and wherein the skipping step comprises the step of skipping the candidate message during the current frame, when the selective call address corresponding to the candidate message has been recorded in the predetermined memory location.

3. The method of claim 1, wherein the skip indicator comprises a flag that is set in the recording step, and wherein the skipping step comprises the step of skipping the candidate message during the current frame, when the candidate message is a numbered message and the flag of the skip indicator is set.

4. The method of claim 1, further comprising the step of clearing the skip indicator when the current frame of data has been formed.

5. The method of claim 1, wherein the message queue is a first-in first-out (FIFO) queue, and wherein the selecting step comprises the step of selecting as the candidate message an oldest message in the message queue that has not yet been selected as the candidate message for the current frame of data.

6. The method of claim 1, wherein the repeating step comprises the step of repeating the selecting, testing, recording, skipping and adding steps until the current frame of data has been filled.

7. The method of claim 1, wherein the repeating step comprises the step of repeating the selecting, testing, recording, skipping and adding steps until every message in the message queue has been selected as the candidate message for the current frame.

8. The method of claim 1, wherein the radio messaging system includes a repetition limit, and wherein the repeating step comprises the step of repeating the selecting, testing, recording, skipping and adding steps for a number of repeats until the number of repeats is such that an additional repeat would exceed the repetition limit.

9. An output controller in a radio messaging system for forming a current frame of data, while maintaining a correct transmission order for numbered messages, the output controller comprising:

an input interface for receiving messages;

a processor coupled to the input interface for processing the messages;

an output interface coupled to the processor for controlling a radio transmitter to transmit the messages; and a memory coupled to the processor for programming the processor and for storing variables processed by the processor, wherein the processor is programmed to:

select a candidate message from a message queue in the memory;

test whether an available space in the current frame of data is sufficient to accommodate the candidate message;

test whether the selected candidate message is a numbered message;

record in a predetermined memory location a skip indicator, in response to the candidate message being a numbered message and the available space in the current frame being insufficient;

skip the candidate message during the current frame even though available space is sufficient, when the skip indicator is recorded in the predetermined memory location and is applicable to the candidate message;

add the candidate message to the current frame of data, when the available space in the current frame is sufficient and the candidate message is a message not affected by the skip indicator; and continue to select, test, record, skip, and add, as above, to form the current frame of data.

10. The output controller of claim 9, wherein the skip indicator comprises a selective call address corresponding to the candidate message, and wherein the processor is further programmed to skip the candidate message during the current frame, when the selective call address corresponding to the candidate message has been recorded in the predetermined memory location.

11. The output controller of claim 9, wherein the skip indicator comprises a flag that is set in the memory, and wherein the processor is further programmed to skip the candidate message during the current frame, when the candidate message is a numbered message and the flag of the skip indicator is set.

12. The output controller of claim 9, wherein the processor is further programmed to clear the skip indicator when the current frame of data has been formed.

13. The output controller of claim 9, wherein the message queue is a first-in first-out (FIFO) queue, and wherein the processor is further programmed to select as the candidate message an oldest message in the message queue that has not yet been selected as the candidate message for the current frame of data.

14. The output controller of claim 9, wherein the processor is further programmed to continue to select, test, record, skip, and add, as above, to form the current frame of data, until the current frame of data has been filled.

15. The output controller of claim 9, wherein the processor is further programmed to continue to select, test, record, skip, and add, as above, to form the current frame of data, until every message in the message queue has been selected as the candidate message for the current frame.

16. The output controller of claim 9, wherein the output controller includes a repetition limit, and wherein the processor is further programmed to continue to select, test, record, skip, and add, as above, to form the current frame of data, for a number of repeats until the number of repeats is such that an additional repeat would exceed the repetition limit.

* * * * *